US008654413B2

(12) United States Patent
Yamasaki

(10) Patent No.: US 8,654,413 B2
(45) Date of Patent: Feb. 18, 2014

(54) READER AND IMAGE FORMING APPARATUS

(75) Inventor: Shunsuke Yamasaki, Osaka (JP)

(73) Assignee: Kyocera Document Solutions Inc. (JP)

( * ) Notice: Subject to any disclaimer, the term of this patent is extended or adjusted under 35 U.S.C. 154(b) by 56 days.

(21) Appl. No.: 13/494,598

(22) Filed: Jun. 12, 2012

(65) Prior Publication Data
US 2013/0003143 A1 Jan. 3, 2013

(30) Foreign Application Priority Data

Jun. 30, 2011 (JP) ................................ 2011-145943

(51) Int. Cl.
*H04N 1/04* (2006.01)
(52) U.S. Cl.
USPC ............ 358/474; 358/471; 358/482; 358/483
(58) Field of Classification Search
USPC .......................... 358/474, 471, 482, 483, 497
See application file for complete search history.

(56) References Cited

U.S. PATENT DOCUMENTS

| 5,585,937 | A | 12/1996 | Kokubo et al. |
| 5,724,159 | A | 3/1998 | Nakagawa et al. |
| 7,068,401 | B2 * | 6/2006 | Johnson et al. ............... 358/474 |
| 7,268,922 | B2 * | 9/2007 | Hsu ............................... 358/474 |

FOREIGN PATENT DOCUMENTS

| JP | 7-234455 | 9/1995 |
| JP | 7-240821 | 9/1995 |
| JP | 2001-235810 | 8/2001 |

* cited by examiner

*Primary Examiner* — Houshang Safaipour
(74) *Attorney, Agent, or Firm* — Gerald E. Hespos; Michael J. Porco; Matthew T. Hespos

(57) ABSTRACT

A reader includes a housing with a platen on which a document is placed, a light source unit which moves along the platen and irradiates light toward the document, a mirror unit which works with the light source unit to define an optical path of the reflected light from the document in the housing, and a rotatable lock member mounted on one of the light source and mirror units. The housing includes an operation member, which is slid to fix the light source and mirror units, and a slide surface, which holds the sliding operation member. The lock member is rotated between an engaged position, where the lock member is engaged with another of the light source and mirror units, and a disengaged position, where the lock member is disengaged from the other of the light source and mirror units in response to slide operation of the operation member.

9 Claims, 11 Drawing Sheets

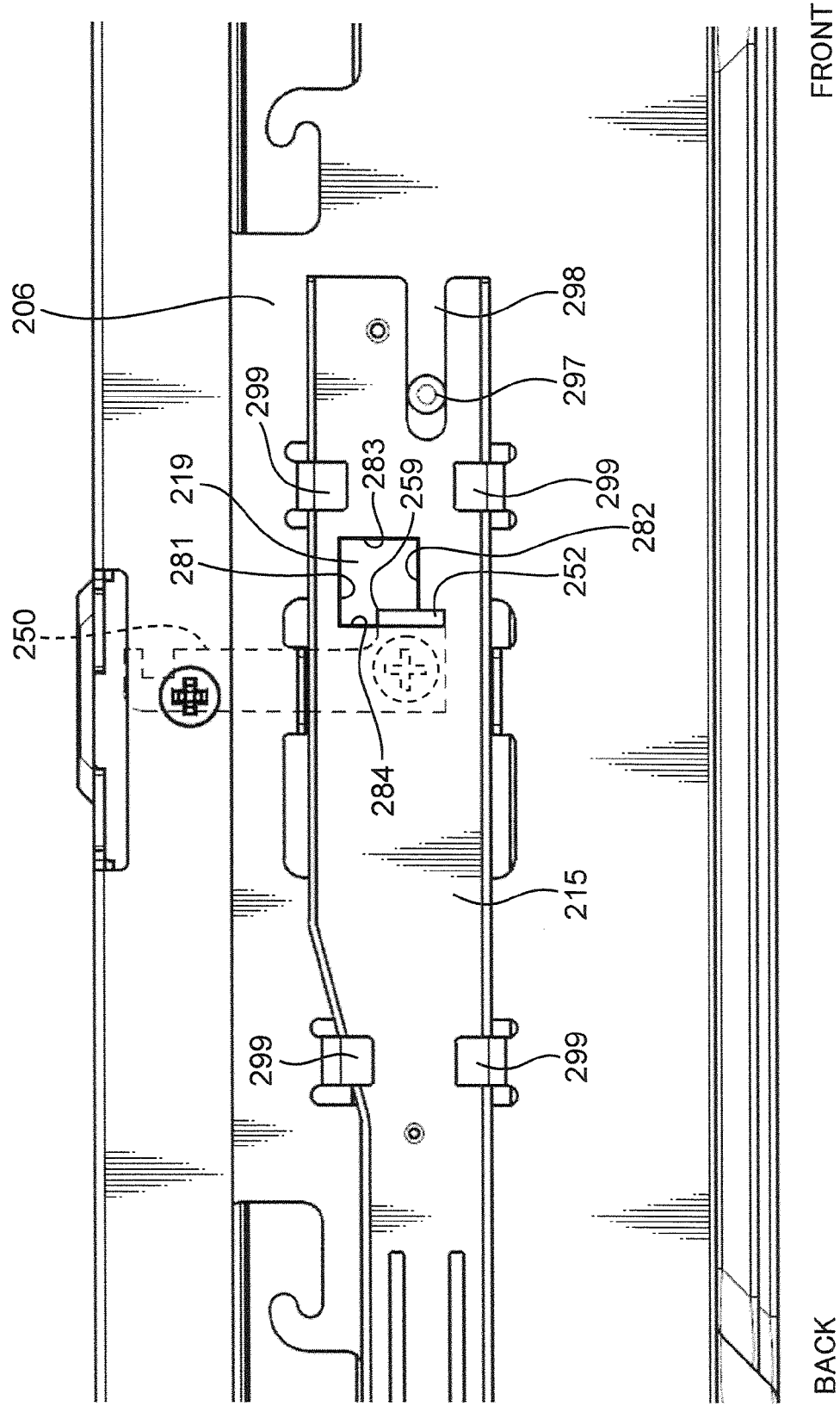

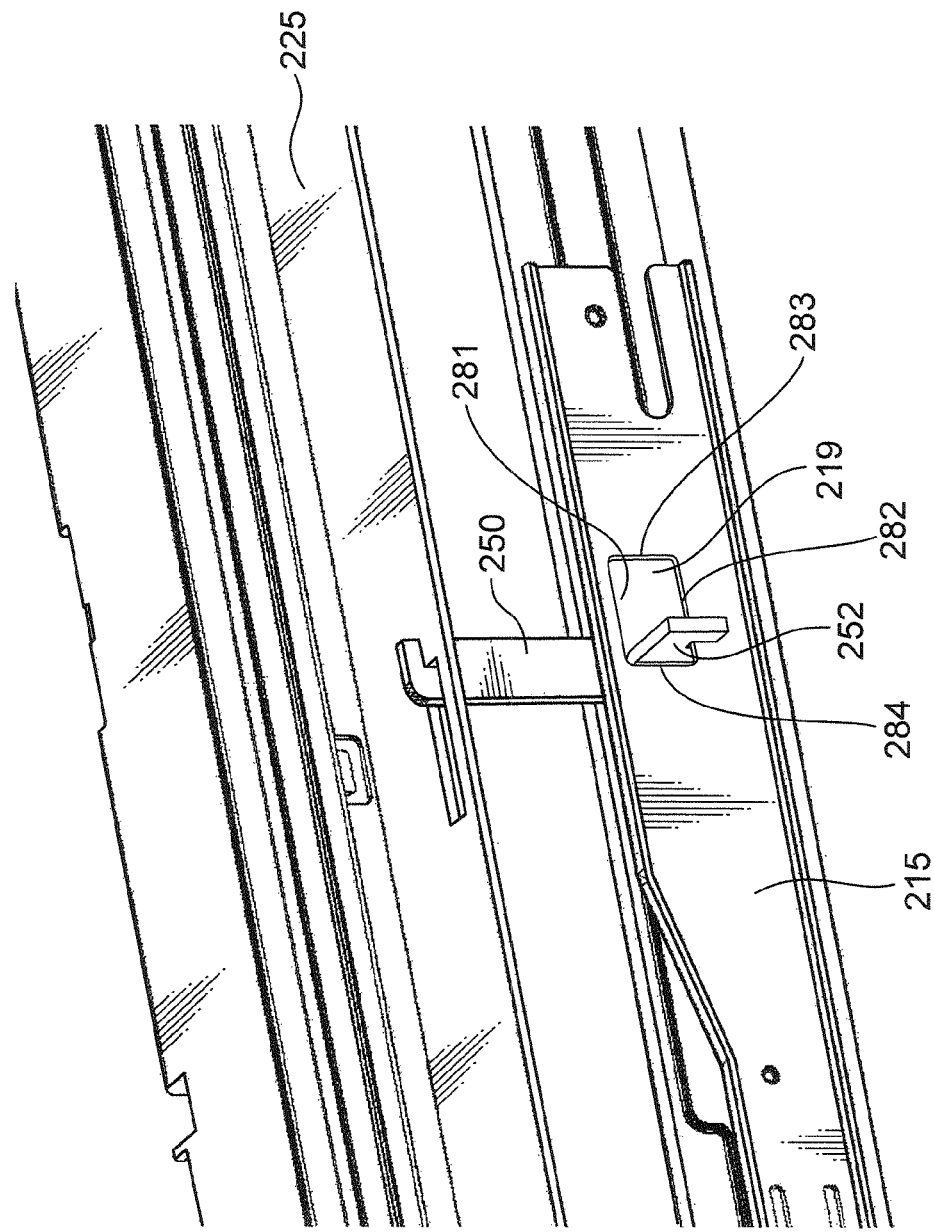

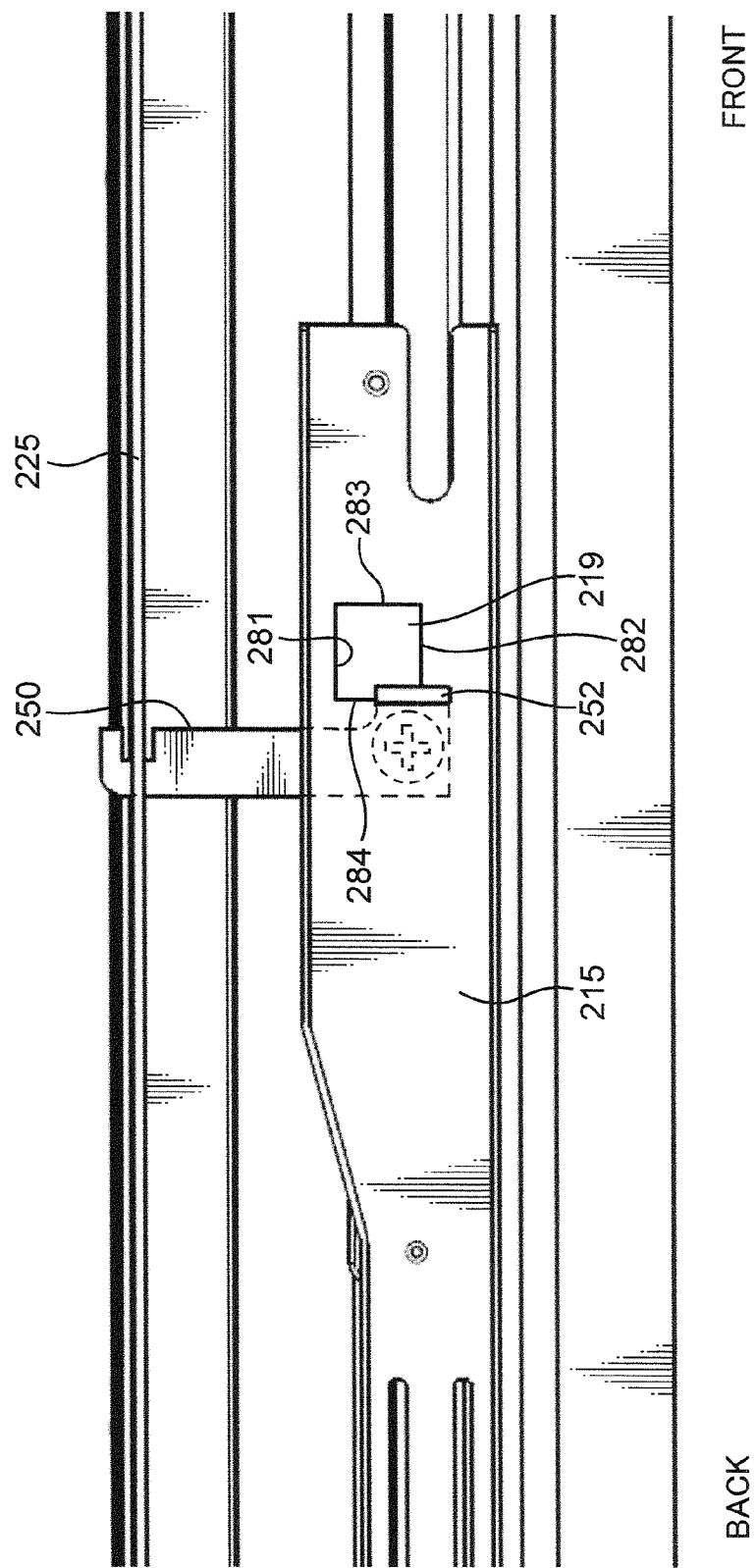

READER AND IMAGE FORMING APPARATUS

RELATED APPLICATIONS

This application claims priority to Japanese Patent Application Serial Number 2011-145943, filed on Jun. 30, 2011 by at least one common inventor, and which is incorporated herein by reference in its entirety.

BACKGROUND

The following disclosure is related to a reader for reading an image on a document and an image forming apparatus with the reader.

DESCRIPTION OF THE RELATED ART

An image forming apparatus such as a copier or a scanner often includes a transparent platen, a light source unit, which moves below the platen, a mirror unit, which moves with the light source unit, and an optical element (e.g. CCD camera), which generates image data about a document in response to the reflected light from the document. A user may place a document on the platen. The moving light source unit emits light, so that the reflected light from the document travels to the mirror unit. The mirror unit moves to maintain a predetermined optical distance between the CCD camera and the light source unit.

The aforementioned interlocking movements of the mirror unit and the light source unit are typically achieved by means of a wire and a spring used for maintaining a constant tension of the wire.

The reader includes various optical members. In order to maintain high accuracy in reading documents, the optical members in the reader have to be properly fixed while the reader is transported.

Since the mirror unit and the light source unit are mechanically connected to each other as described above, it has been considered it is enough if only one unit is fixed during the transportation of the reader.

However, the present inventors found out that if the only one unit was fixed, the other unit was affected by a large shock during the transportation.

SUMMARY

An object of the following disclosure is to provide a reader configured to appropriately maintain its optical settings during transportation of the reader and an image forming apparatus with the reader.

One disclosed aspect is directed to a reader including a housing with a platen, on which a document is placed, a light source unit, which moves along the platen and irradiates light toward the document, a mirror unit, which works with the light source unit to define an optical path of reflected light from the document in the housing, and a rotatable lock member mounted on one of the light source unit and the mirror unit. The housing includes an operation member, which is slid to fix the light source unit and the mirror unit, and a slide surface, which holds the sliding operation member. The lock member is rotated between an engaged position, where the lock member is engaged with another of the light source unit and the mirror unit, and a disengaged position, where the lock member is disengaged from the other of the light source unit and the mirror unit in response to slide operation of the operation member.

Another disclosed aspect is directed to an image forming apparatus including an image forming unit configured to form an image in response to image data read by the aforementioned reader.

These and other objects, features and advantages will become more apparent upon reading the following detailed description along with the accompanying drawings.

BRIEF DESCRIPTION OF THE DRAWINGS

FIG. 9 is a schematic diagram of a left wall which holds an operation plate of the reader shown in FIG. 3, FIG. 10 is a schematic perspective view of the lock member which is engaged with the operation plate and an engaging flap shown in FIG. 9, and FIG. 11 is a schematic diagram of the lock member which is engaged with the operation plate and an engaging flap shown in FIG. 9.

DESCRIPTION

Hereinafter, a reader and an image forming apparatus according to one embodiment are described with reference to the accompanying drawings. It should be noted that directional terms such as "upper", "lower", "left", "right", "front" and "back/rear" used in the following descriptions are merely for the purpose of clarification, and do not limit principles of the reader and the image forming apparatus. In the following descriptions, the term "front" means a side on which a user operates the image forming apparatus and the term "back/rear" means the opposite side to the "front" side of the image forming apparatus (see FIG. 1). A term "sheet" used in the following descriptions means a copy sheet, tracing paper, cardboard, OHP sheet or another sheet on which an image may be formed.

<Image Forming Apparatus>

Figure 1:
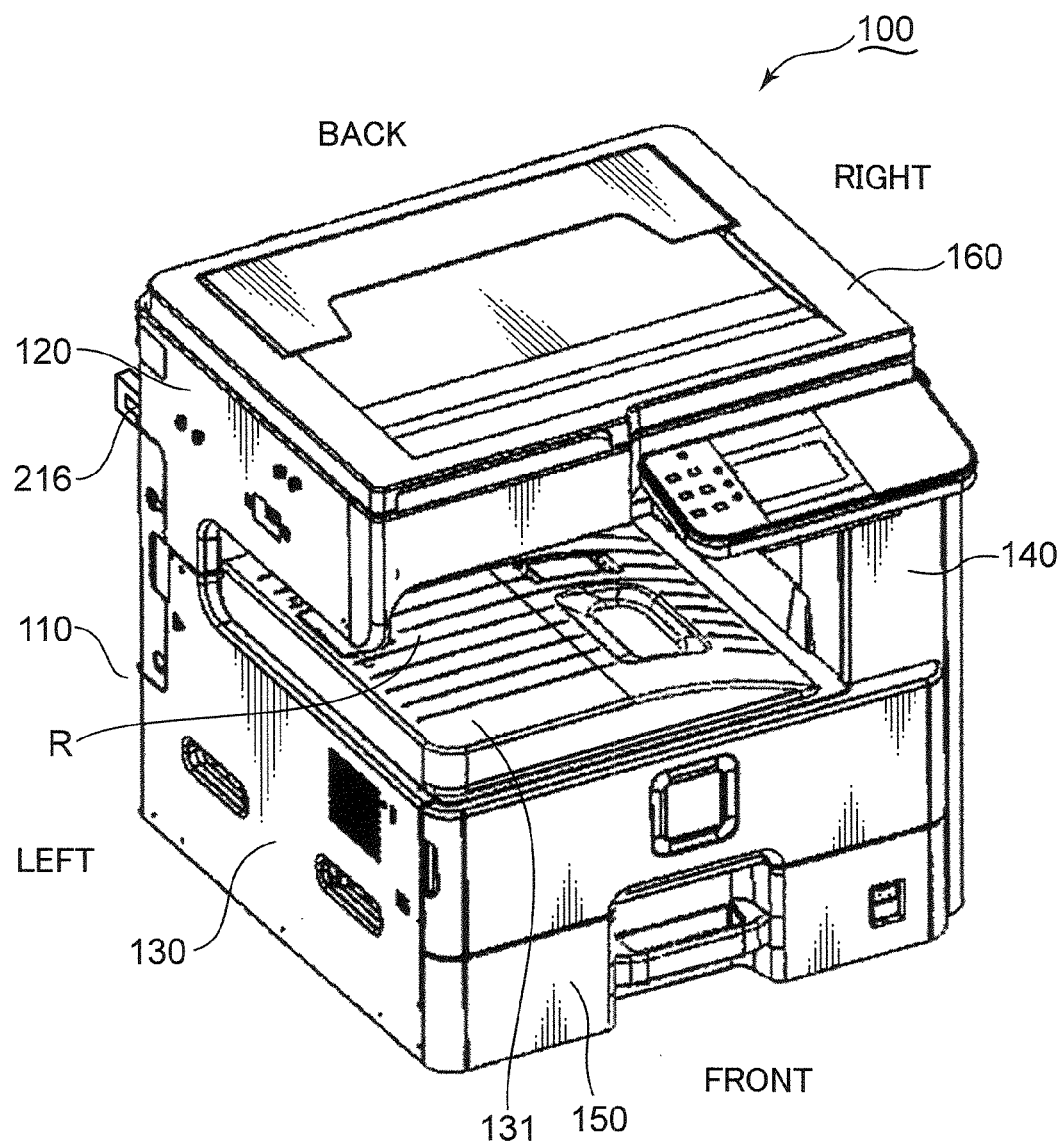
FIG. 1 is a schematic perspective view of a copier exemplified as an image forming apparatus.

FIG. 1 is a schematic perspective view of a copier 100 exemplified as the image forming apparatus. It should be noted that another apparatus such as a scanner or a device configured to read an image on a document may be used as the image forming apparatus.

The copier 100 includes a main housing 110 configured to store various devices to form images. The main housing 110 includes an upper housing 120, which contains a reader (described later), a lower housing 130, which is situated below the upper housing 120, and an intermediate housing 140, which is situated between the upper and lower housings 120, 130.

The copier 100 further includes a cassette 150 stored in the lower housing 130. A user may pull the cassette 150 forward to store sheets in the cassette 150. The user may then push the cassette 150 into the lower housing 130.

The copier 100 includes an image forming unit (described later) configured to form an image on a sheet. The lower housing 130 stores the image forming unit. The image forming unit forms an image on a sheet conveyed from the cassette 150.

The copier 100 includes a discharge mechanism (described later) configured to discharge a sheet after the image formation. The intermediate housing 140 stores the discharge mechanism. A space R is defined between the upper and lower housings 120, 130. The discharge mechanism in the intermediate housing 140 discharges a sheet to the space R. The discharged sheets are accumulated and stacked on the upper surface 131 of the lower housing 130.

The copier 100 further includes a cover 160 configured to cover the upper surface of the upper housing 120. The rotatable cover 160 is mounted to the main housing 110. The user may rotate the cover 160 upward. A glass plate (described later), on which a document is placed, appears if the cover 160 is rotated upward. The user may rotate the cover 160 downward after placing the document on the glass plate to stably hold the document between the cover 160 and the glass plate.

It should be noted that the cover 160 may include a mechanism configured to automatically feed a document onto the glass plate. Document feeders used in various existing copiers are exemplified as such a mechanism.

Figure 2:
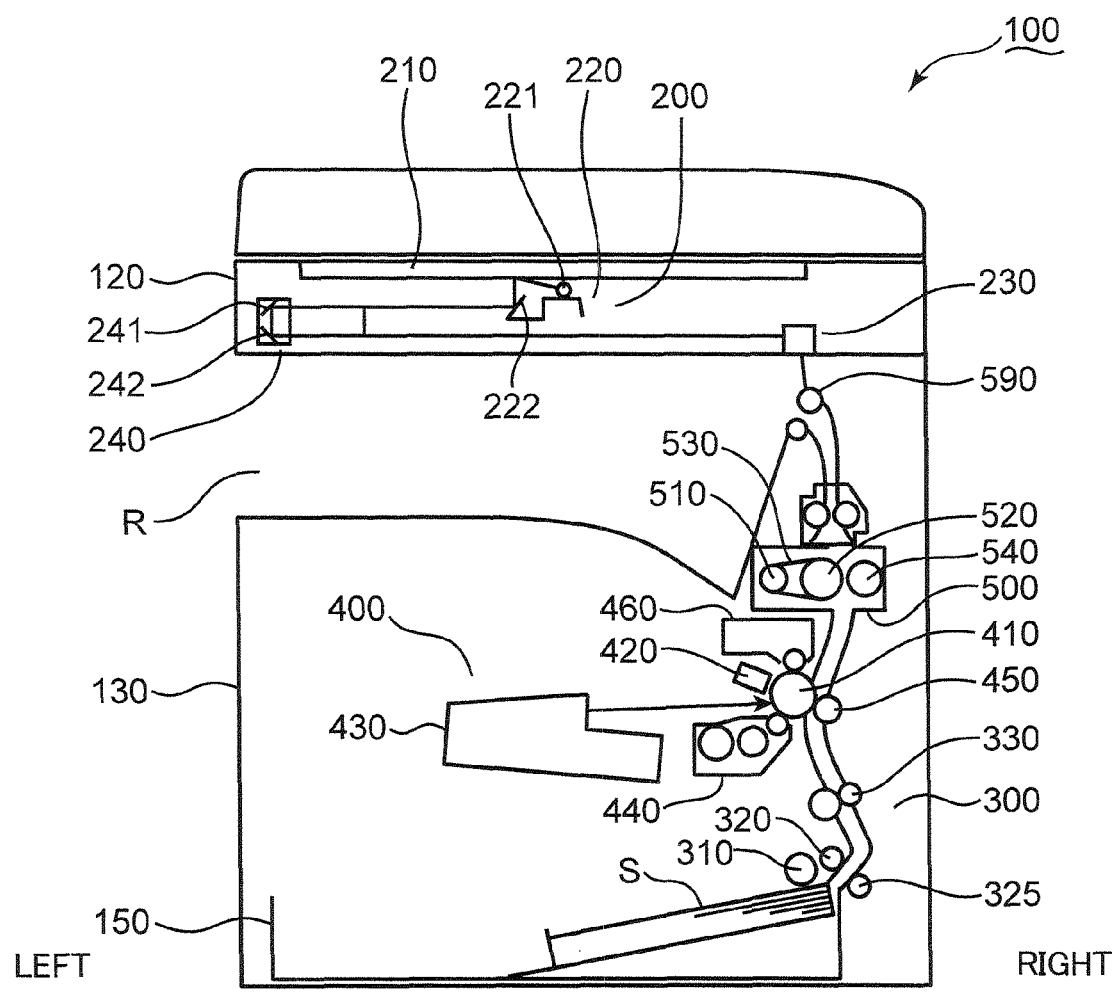
FIG. 2 is a schematic sectional view of the internal structure of the copier shown in FIG. 1.

FIG. 2 is a schematic sectional view of the internal structure of the copier 100. The internal structure of the copier 100 is described with reference to FIGS. 1 and 2.

As described above, the copier 100 includes the reader 200 configured to read an image on a document. The reader 200 is situated in the upper housing 120.

In addition to the aforementioned glass plate 210, the reader 200 includes a light source unit 220 which traverses below the glass plate 210. The light source unit 220 includes a light source 221, which irradiates light toward a document on the glass plate 210, and a first mirror 222, which receives the reflected light from the document. In this embodiment, the transparent glass plate 210 is exemplified as the platen. Alternatively, another member (e.g. transparent plastic plate), which appropriately supports a document and transmits the incident and reflected light to and from the document, may be used as the platen.

The reader 200 further includes a CCD camera 230, which generates data about the image of the document (hereinafter, referred to as image data) in response to the reflected light from the document, and a mirror unit 240, which defines an optical path of the reflected light between the CCD camera 230 and the mirror unit 240. The first mirror 222 of the light source unit 220 reflects the reflected light from the document toward the mirror unit 240. The mirror unit 240 includes a second mirror 241, which receives the reflected light from the first mirror 222, and a third mirror 242, which is situated below the second mirror 241. The second mirror 241 reflects the reflected light from the first mirror 222 toward the third mirror 242. The third mirror 242 reflects the reflected light from the second mirror 241 toward the CCD 230. The CCD camera 230 receives the reflected light to generate the image data in response to color phases and intensities of the reflected light. In this embodiment, the CCD camera 230 is exemplified as the data generator.

The mirror unit 240 traverses with the horizontal movement of the light source unit 220 to keep the optical length constant between the light source unit 220 and the CCD camera 230, so that the CCD camera 230 may appropriately generate the image data. The image data generated by the CCD camera 230 are used for the image formation by the aforementioned image forming unit 400. It should be noted that the structure of the image forming unit 400 is described later.

It should be noted that a mechanism used in an existing copier may be employed as a driving mechanism to move the light source unit 220 and the mirror unit 240 together. Another optical device (e.g. CMOS camera) configured to generate the image data in response to the reflected light from a document may be used instead of the CCD camera 230.

The copier 100 further includes a feeder 300 configured to convey and guide a sheet S from the aforementioned cassette 150 to the image forming unit 400. As described above, a stack of sheets S is stored in the cassette 150. The cassette 150 pushes up one end of the stacked sheets S. The feeder 300 includes a pickup roller 310 which is in contact with the stack of sheets S pushed up in the cassette 150. The pickup roller 310 rotates to pick up the sheet S from the cassette 150.

The feeder 300 further includes a feed roller 320, which conveys downstream the sheet S picked up by the pickup roller 310, and a separation roller 325, which rotates to push back the sheet S picked up by the pickup roller 310 toward the cassette 150. If the pickup roller 310 picks up several sheets S from the cassette 150, only the sheet S directly in contact with the feed roller 320 is conveyed downstream whereas the other sheet(s) S is/are pushed back to the cassette 150. If the pickup roller 310 picks up one sheet S, the feed roller 320 overcomes the separation roller 325 to convey the sheet S downstream. Thus, the sheets S are conveyed one by one downstream.

The feeder 300 further includes a pair of registration rollers 330 which relays the sheet S from the feed roller 320 to the image forming unit 400. The paired registration rollers 330 feed the sheet S to the image forming unit 400 in synchronization with an image forming process in the image forming unit 400.

Other various existing mechanisms configured to convey a sheet to an image forming unit may be adopted as the feeder. For example, a pad, which applies a frictional force to a sheet S, or a roller structure of which rotation is controlled by a torque, may be used instead of the separation roller 325.

The image forming unit 400 includes a rotary photoconductive drum 410 in the lower housing 130 and a charger 420, which substantially uniformly charges the circumferential surface of the photoconductive drum 410. The image forming unit 400 further includes an exposure device 430 configured to irradiate light on the substantially uniformly charged circumferential surface of the photoconductive drum 410. The exposure device 430 executes a scanning operation with the laser beam in response to the aforementioned image data to form an electrostatic latent image corresponding to the obtained image data on the circumferential surface of the photoconductive drum 410.

The image forming unit 400 further includes a developing device 440 configured to supply toner to the circumferential surface of the photoconductive drum 410 on which an electrostatic latent image is formed. As a result of the toner supply from the developing device 440, the electrostatic latent image is developed (visualized) so that a toner image is formed on the circumferential surface of the image forming unit 400.

The image forming unit 400 further includes a transfer roller 450. A sheet S fed from the paired registration rollers 330 passes between the photoconductive drum 410 and the transfer roller 450. Meanwhile, the toner image on the circumferential surface of the photoconductive drum 410 is electrostatically transferred to the sheet S. In this way, the transfer of the toner image to the sheet S is completed.

The image forming unit 400 further includes a cleaning device 460 configured to remove toner remaining after the transfer of the toner image from the photoconductive drum 410. The circumferential surface of the photoconductive drum 410 cleaned by the cleaning device 460 is charged again by the charger 420.

In this embodiment, the image forming unit 400 forms a single-color toner image on a sheet S. Alternatively, an existing image forming unit for forming an image using toners of several colors may be used.

In this embodiment, the image forming unit 400 forms a toner image by means of powder toner. Alternatively, an electrostatic latent image may be developed by means of liquid developer.

The copier 100 further includes a fixing unit 500 configured to fix the toner image transferred to a sheet S. The fixing unit 500 includes a heating roller 510 with a built-in heat source (not shown), a fixing roller 520, which fixes the toner image to the sheet S, a heating belt 530, which revolves around the heating roller 510 and the fixing roller 520, and a pressure roller 540, which is pressed against the fixing roller 520. The heating roller 510 heats the heating belt 530. The heating belt 530, then, passes between the fixing roller 520 and the pressure roller 540. The sheet S passes between the heating belt 530 surrounding the fixing roller 520 and the pressure roller 540. The pressure roller 540 presses the toner image on the sheet S against the heating belt 530. As a result, the toner image is fixed to the sheet S.

Another structure configured to fix toner on a sheet S may be adopted as the fixing unit. For example, an induction heating unit may be used as a heat source to fix a toner image. Alternatively, a toner image on a sheet S may be directly pressed against a heated roller. An existing structure used to fix a toner image in an existing copier may be applied to the fixing unit.

In this embodiment, a discharge roller 590 is used as the aforementioned discharge mechanism. The discharge roller 590 discharges the sheet S, to which the toner image is fixed, to the space R between the upper and lower housings 120, 130.

In this embodiment, the copier 100 forms a toner image on one side of a sheet S. Additionally, the copier may include an existing device configured to form toner images on both sides of a sheet.

<Reader>

Figure 3:
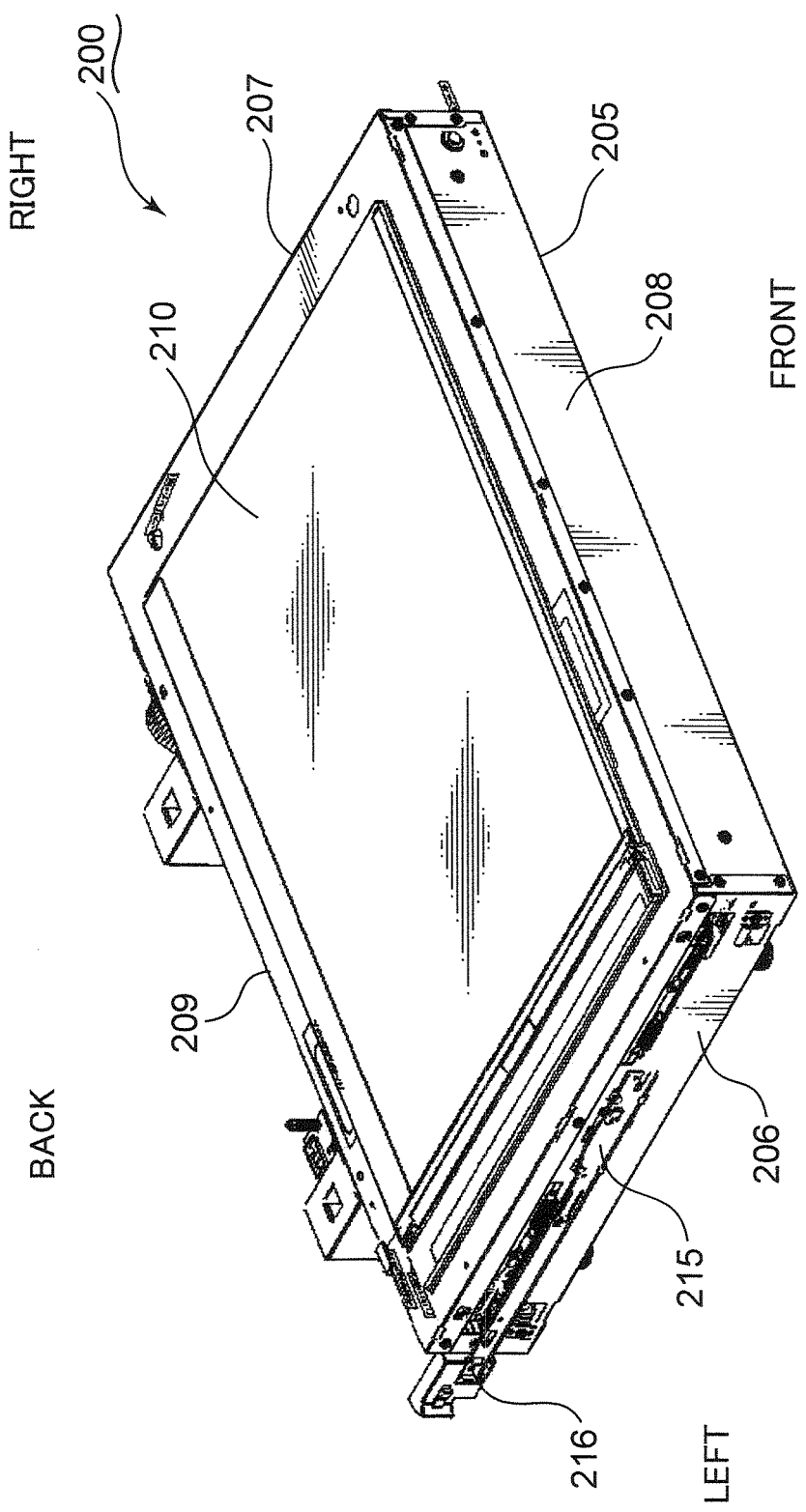
FIG. 3 is a schematic perspective view of a reader provided in the copier shown in FIG. 1.

FIG. 3 is a schematic perspective view of the aforementioned reader 200. The reader 200 is described with reference to FIGS. 1 to 3.

The reader 200 further includes a housing 205 configured to support the aforementioned glass plate 210. The aforementioned light source unit 220, mirror unit 240 and CCD camera 230 are stored in the housing 205.

The housing 205 is properly held in the upper housing 120. The glass plate 210 mounted on the housing 205 appears on the upper surface of the upper housing 120 if the housing 205 is mounted in the upper housing 120.

The housing 205 includes a left wall 206, a right wall 207 opposite to the left wall 206, a front wall 208 extending between the left and right walls 206, 207, and a rear wall 209 opposite to the front wall 208. The housing 205 further includes an operation plate 215 mounted on the outer surface of the left wall 206. The operation plate 215 is held on the outer surface of the left wall 206 so that the operation plate is allowed to slide on the outer surface.

The operation plate 215 includes a grip 216 projecting from the rear wall 209. As shown in FIG. 1, the grip 216 appears outside the main housing 110 of the copier 100. The user may move the grip 216 appearing outside the housing 110 to operate the operation plate 215. As described later, the operation plate 215 is used to fix the light source unit 220 and the mirror unit 240 during transportation of the reader 200. After the transportation of the reader 200 (transportation of the copier 100), the user may operate the operation plate 215 again to release the light source unit 220 and the mirror unit 240. After the releasing process, the light source unit 220 and the mirror unit 240 in the housing 205 may reciprocate between the left and right walls 206, 207. It should be noted that the grip 216 may be stored in the housing of the copier. In this case, the user may dismantle a part (e.g. outer panel) of the housing of the copier to hold and operate the grip 216. In this embodiment, the operation plate 215 slides along the outer surface of the left wall 206. Thus, the outer surface of the left wall 206 is exemplified as the slide surface.

Figure 4:
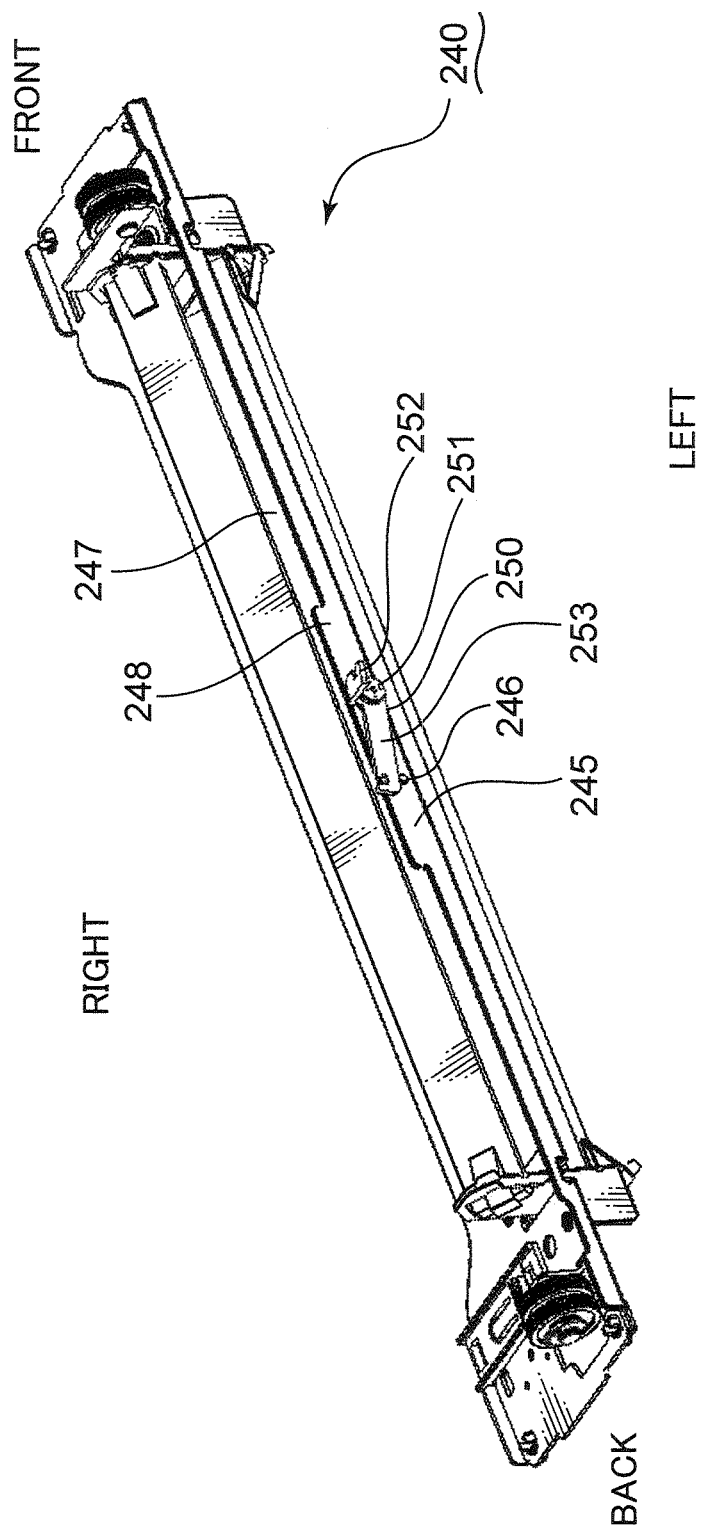
FIG. 4 is a schematic perspective view of a mirror unit of the reader shown in FIG. 3.

FIG. 4 is a schematic perspective view of the mirror unit 240. The mirror unit 240 is described with reference to FIGS. 2 to 4.

The mirror unit 240 further includes a facing surface 245 which faces the left wall 206 of the housing 205. The facing surface 245 extends along (i.e. substantially in parallel with) the left wall 206. The reader 200 further includes a substantially L-shaped rotatable lock member 250, which is mounted on the facing surface 245, and a screw 251, which connects the lock member 250 to the facing surface 245. The lock member 250 rotates around the screw 251. The facing surface 245, on which the lock member 250 is mounted, is exemplified as the fixed surface.

The lock member 250 includes a first lock arm 252, which projects toward the left wall 206, and a second lock arm 253, which extends along the facing surface 245. A projection 246 projecting toward the left wall 206 is formed on the facing surface 245.

The position of the lock member 250 shown in FIG. 4 is called a disengaged position in the following descriptions. The lock member 250 is disengaged with the operation plate 215 and the light source unit 220 at the disengaged position. The projection 246 is in contact with the second lock arm 253 of the lock member 250 at the disengaged position to prevent further downward rotation of the second lock arm 253. Accordingly, the disengaged position of the lock member 250 is defined by the contact of the projection 246 and the second lock arm 253.

The mirror unit 240 further includes a projecting wall 247, which projects from the upper edge of the facing surface 245 toward the left wall 206. The projecting wall 247 is formed with a substantially C-shaped notch 248. The second lock arm 253 may rotate upward through the notch 248.

Figure 5A:
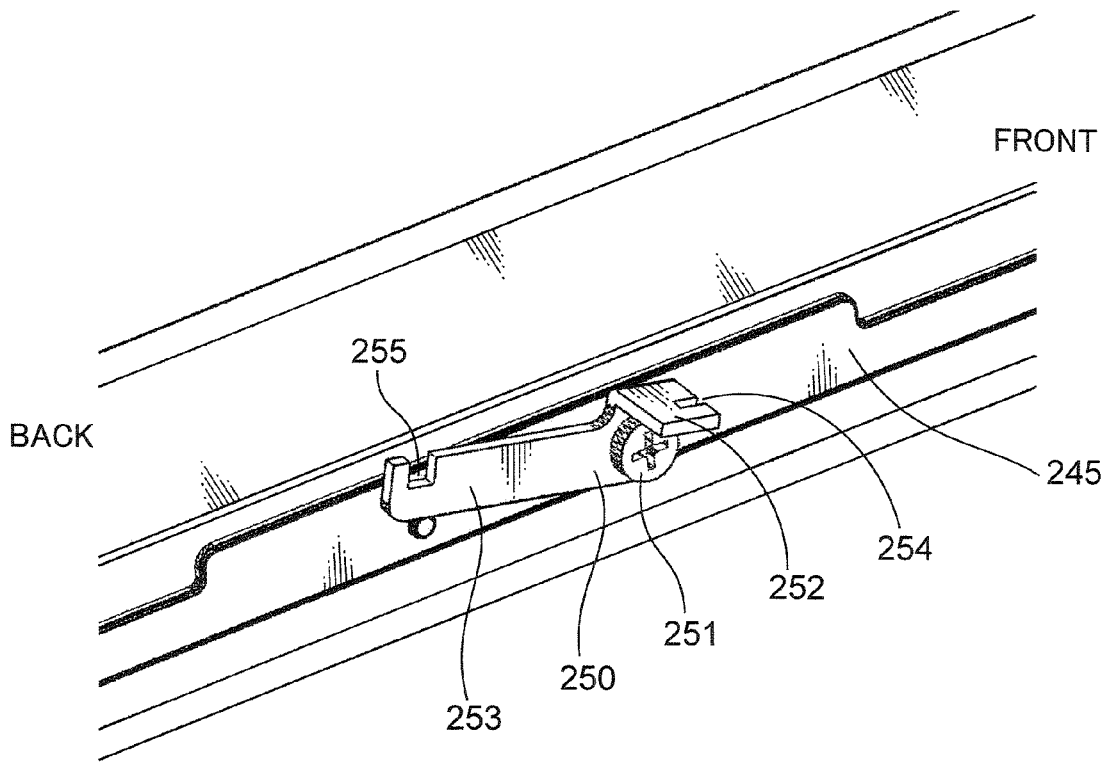
FIG. 5A is an enlarged perspective view of a lock member (disengaged position) of the reader shown in FIG. 3.
Figure 5B:
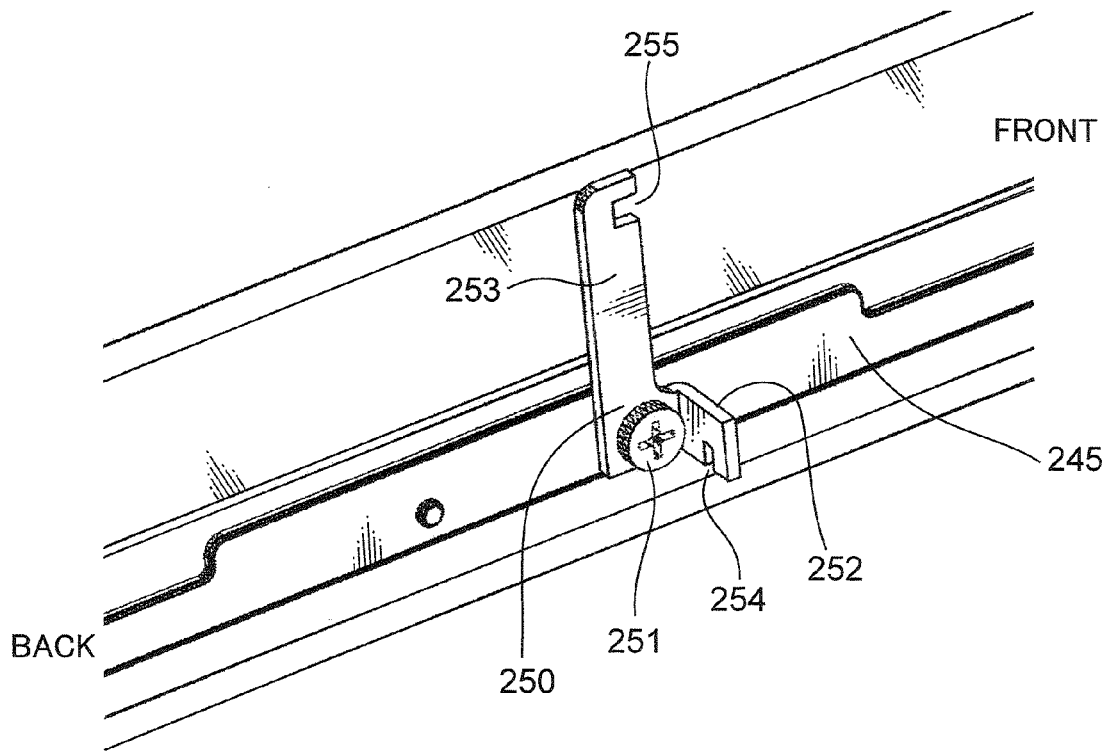
FIG. 5B is an enlarged perspective view of the lock member (engaged position) of the reader shown in FIG. 3.

FIG. 5A is an enlarged perspective view of the lock member 250 at the disengaged position. FIG. 5B is an enlarged perspective view of the lock member 250 at an engaged position. The disengaged position and the engaged position of the lock member 250 are described with reference to FIGS. 2 to 5.

As described above, the lock member 250 mounted on the facing surface 245 rotates around the screw 251. The position of the lock member 250 rotated upward substantially by 90° from the disengaged position is the engaged position.

The first lock arm 252 is formed with a first slit 254. If the lock member 250 is at the disengaged position, the first slit 254 is open forward. If the lock member 250 is at the engaged position, the first slit 254 is open downward. As described later, the aforementioned operation plate 215 is inserted into the first slit 254 which is open downward.

The second lock arm 253 is formed with a second slit 255. If the lock member 250 is at the disengaged position, the second slit 255 is open upward. If the lock member 250 is at the engaged position, the second slit 255 is open forward. As described later, a part of the aforementioned light source unit 220 is inserted into the second slit 255 which is open forward.

Figure 6:
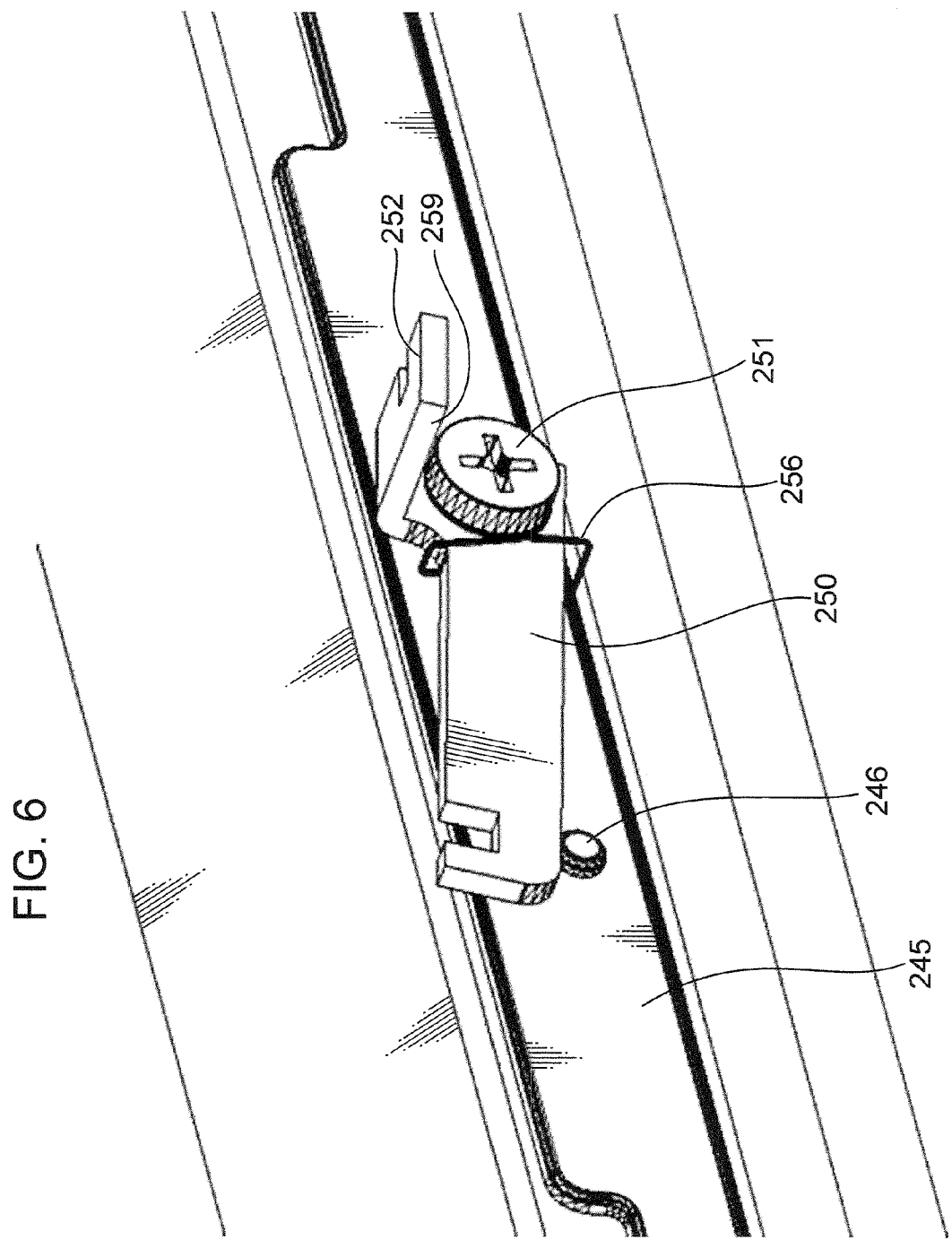
FIG. 6 is a schematic enlarged perspective view around a connecting portion of the lock member shown in FIGS. 5A and 5B.

FIG. 6 is a schematic enlarged perspective view around the connection between the lock member 250 and the facing surface 245. The lock member 250 is further described with reference FIGS. 5A to 6.

The lock member 250 is mounted on the facing surface 245 by means of a torsion spring 256 in addition to the aforementioned screw 251. The torsion spring 256 biases the lock member 250 toward the disengaged position. In this embodiment, the torsion spring 256 is exemplified as the biasing member.

Figure 7:
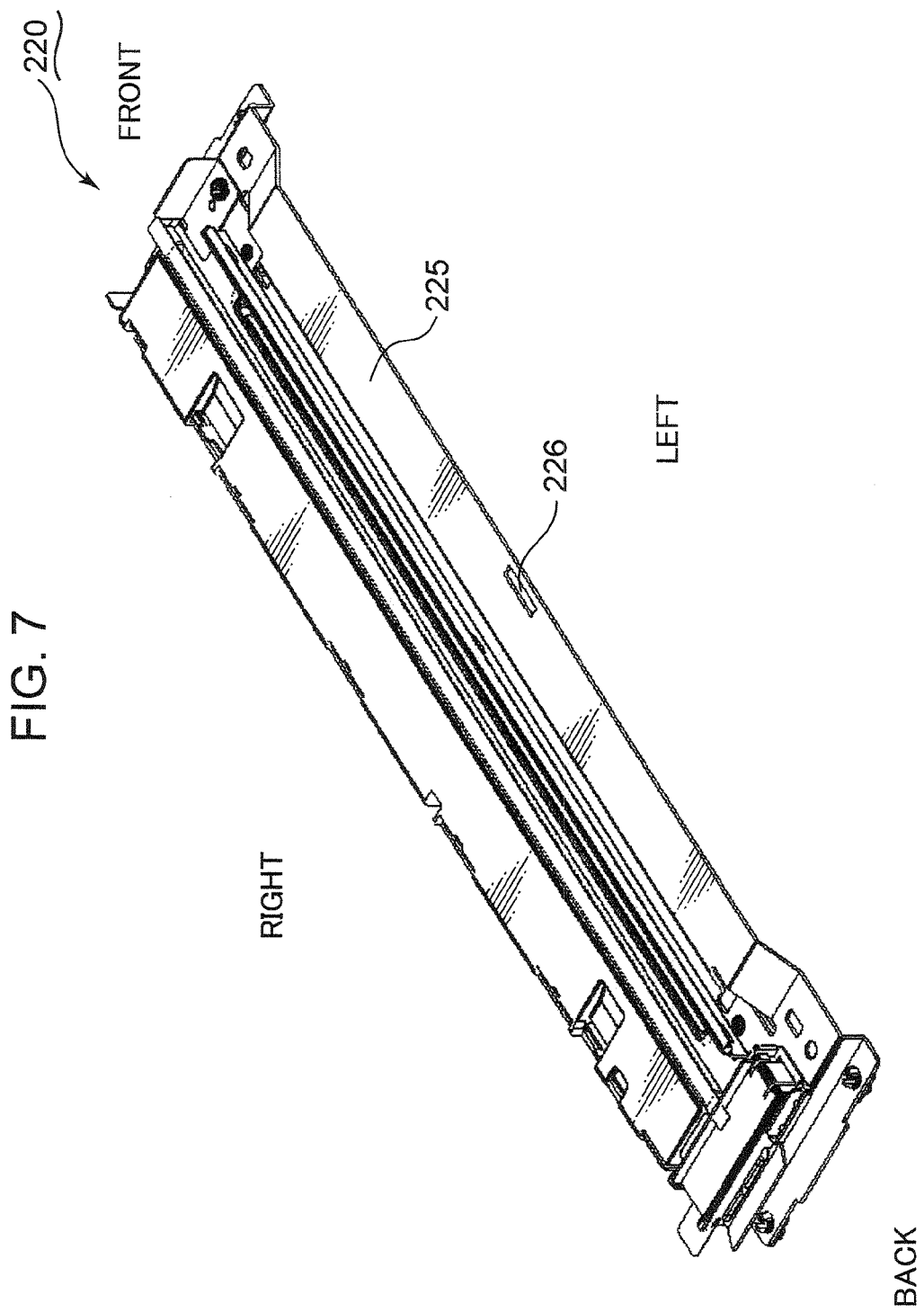
FIG. 7 is a schematic perspective view of a light source unit of the reader shown in FIG. 3.
Figure 8:
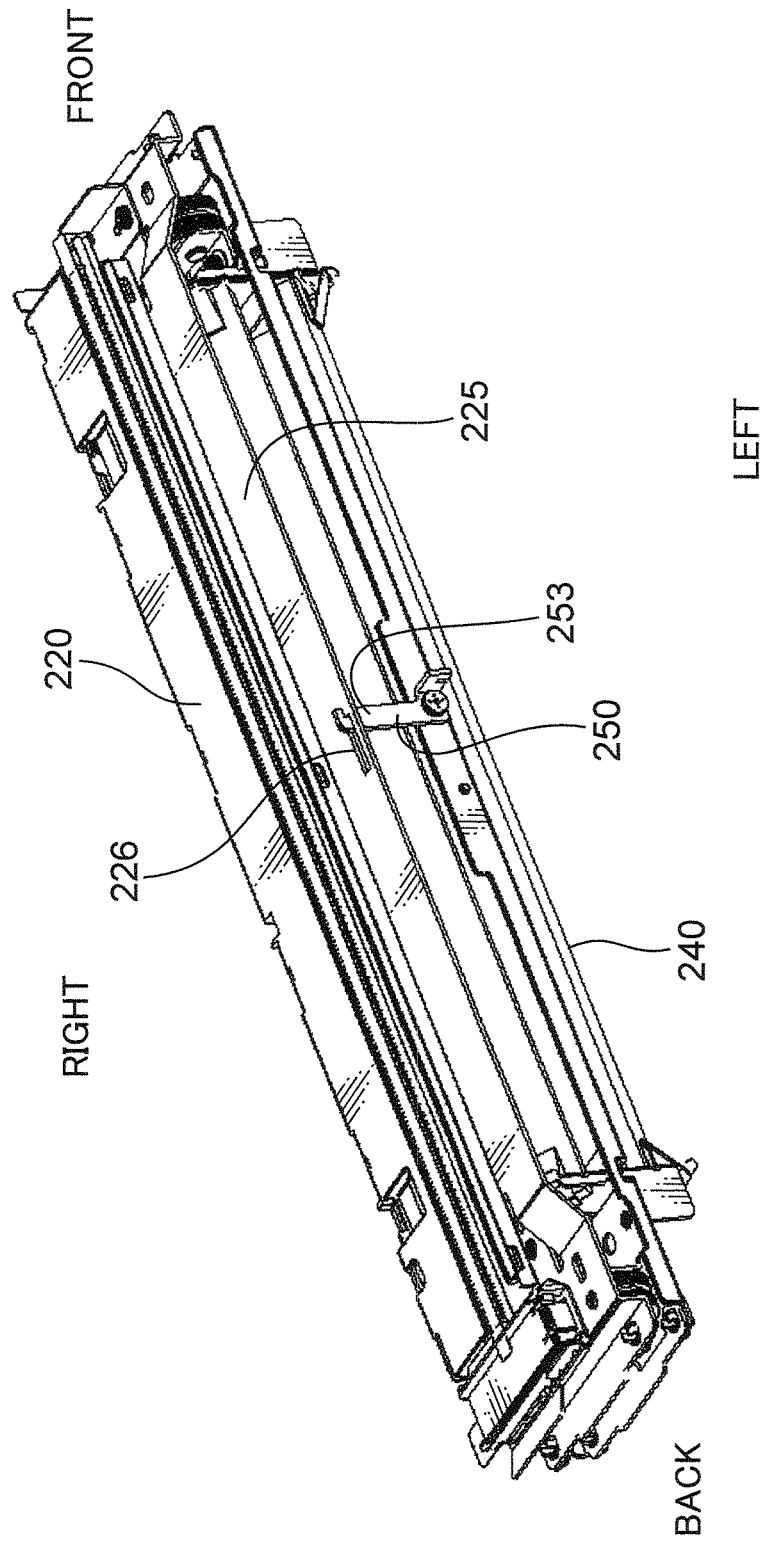
FIG. 8 is a schematic perspective view of the light source unit connected to the mirror unit shown in FIG. 4.

FIG. 7 is a schematic perspective view of the light source unit 220. FIG. 8 is a schematic perspective view of the light source unit 220 connected to the mirror unit 240 by the lock member 250, which is mounted on the mirror unit 240. Engagement between the lock member 250 and the light source unit 220 is described with reference to FIGS. 3, 5B, 7 and 8.

The mirror unit 240 and the light source unit 220 are moved away from and toward the left wall 206. As shown in FIG. 8, the user may bring the light source unit 220 and the mirror unit 240 closer to the left wall 206 to align them along the left wall 206, and then fix the light source unit 220 and the mirror unit 240. In FIG. 8, the light source unit 220 is situated above the mirror unit 240.

The light source unit 220 further includes an engaging flap 225, which projects toward the left wall 206 to cover the facing surface 245. The engaging flap 225 is formed with a slot 226 extending in forward and backward directions so as not to interfere with the second lock arm 253 of the lock member 250 rotating upward from the disengaged position. If the second lock arm 253 reaches the engaged position through the slot 226, an edge defining the front end of the slot 226 is inserted into the second slit 255 (c.f., FIG. 5B). In this embodiment, the engaging flap 225 is exemplified as the engaging piece. The slot 226 is exemplified as the second opening. The edge defining the front end of the slot 226 is exemplified as the second edge.

FIG. 9 is a schematic diagram of the left wall 206 which holds the operation plate 215. The structure to hold the operation plate 215 is described with reference to FIGS. 3, 6 and 9.

The operation plate 215 extends from the rear side to the front side. The operation plate 215 may reciprocate in forward and backward directions.

The operation plate 215 is formed with a substantially rectangular opening 219. The first lock arm 252 of the lock member 250 projects from the operation plate 215 through the opening 219. If the lock member 250 rotates between the disengaged position and the engaged position, the first lock arm 252 rotationally moves in the opening 219. In this embodiment, the opening 219 is exemplified as the first opening.

The contour of the opening 219 includes an upper edge 281, a lower edge 282, which faces the upper edge 281, a front edge 283, which extends between the upper and lower edges 281, 282, and a rear edge 284 which faces the front edge 283. In this embodiment, the upper, lower, front and rear edges 281, 282, 283, 284 are exemplified as the first edge.

If the user moves the operation plate 215 backward, the rear edge 284 separates from the first lock arm 252. Meanwhile, the lock member 250 is rotated toward the disengaged position to follow the movement of the rear edge 284 by a biasing force of the torsion spring 256.

As shown in FIG. 6, the first lock arm 252 includes an interference edge 259. While the lock member 250 is at the disengaged position, the interference edge 259 faces the rear edge 284. If the user moves the operation plate 215 forward, the operation plate 215 interferes with the interference edge 259 of the first lock arm 252.

As shown in FIG. 6, the projection 246 makes the lock member 250 oblique at the disengaged position. Accordingly, the lock member 250 rotates upward around the screw 251 as a result of the interference between the interference edge 259 and the rear edge 284. Meanwhile, the first lock arm 252 rotates in the opening 219. As a result, the lock member 250 rotates to the engaged position.

The left wall 206 includes claws 299 which hold the upper and lower edges of the operation plate 215. A slit 298, which is open forward, is formed in the leading end of the operation plate 215. The left wall 206 further includes a protrusion 297 which protrudes into the slit 298. Therefore, the operation plate 215 may be properly held on the left wall 206 and stably slide along the left wall 206.

FIGS. 10 and 11 schematically show the lock member 250 engaged with the operation plate 215 and the engaging flap 225. It should be noted that the left wall 206 is not shown in FIGS. 10 and 11. The lock member 250 is described with reference to FIGS. 5B, 6, 8, 10 and 11.

If the lock member 250 reaches the engaged position, the lower edge 282 is inserted into the first slit 254 formed in the first lock arm 252. Therefore, the lock member 250 at the engaged position is engaged with the engaging flap 225 and the operation plate 215. In this embodiment, the lower edge 282 is exemplified as the locking insertion edge.

The rear edge 284 is in contact with the upright surface of the first lock arm 252 of the lock member 250 at the engaged position to restrict a forward movement of the operation plate 215. It should be noted that the peripheral edge of the second slit 255 may be in contact with that of the slot 226 to restrict a movement of the operation plate 215. The rear edge 284 restricts the rotation of the lock member 250 to the disengaged position against the biasing force of the torsion spring 256. In this embodiment, the rear edge 284 is exemplified as the restricting edge. It should be noted that another edge for restricting the rotation of the lock member 250 may be used as the restricting edge, instead of the rear edge 284.

If the user moves the operation plate 215 backward, the rear edge 284 is separated from the upright surface of the first lock arm 252. As a result, the lock member 250 is rotated toward the disengaged position by the biasing force of the torsion spring 256.

In this embodiment, the lock member 250 is mounted on the mirror unit 240. Alternatively, a lock member connected to the light source unit may be engaged with the mirror unit and the operation member.

Although the principles of the reader and the image forming apparatus have been fully described by way of example with reference to the accompanying drawings, it is to be understood that various changes and modifications will be apparent to those skilled in the art. Therefore, unless otherwise such changes and modifications depart from the scope of the aforementioned principles, they should be construed as being included therein.

What is claimed is:

1. A reader for reading an image on a document, comprising:

a housing including a platen on which the document is placed;

a light source unit which moves along the platen and irradiates light toward the document;

a mirror unit which works with the light source unit to define an optical path of the reflected light from the document in the housing; and a rotatable lock member mounted on one of the light source unit and the mirror unit, wherein:

the housing includes an operation member, which is slid to fix the light source unit and the mirror unit, and a slide surface, which holds the sliding operation member; and the lock member is rotated between an engaged position, where the lock member is engaged with another of the light source unit and the mirror unit, and a disengaged position, where the lock member is disengaged from the other of the light source unit and the mirror unit in response to slide operation of the operation member.

2. The reader according to claim 1, wherein:

the operation member includes a first edge which defines a first opening for allowing rotation of the lock member;

the lock member includes a first lock arm which is inserted into the first opening; and the first lock arm is formed with a first slit into which the first edge is inserted if the lock member is at the engaged position.

3. The reader according to claim 2, wherein:

the light source unit includes an engaging piece projecting from the slide surface;

the engaging piece includes a second edge which defines a second opening for allowing the rotation of the lock member;

the lock member includes a second lock arm which is inserted into the second opening; and the second lock arm is formed with a second slit into which the second edge is inserted if the lock member is at the engaged position.

4. The reader according to claim 2, further comprising a biasing member configured to bias the lock member toward the disengaged position.

5. The reader according to claim 4, wherein the first edge includes:

a locking insertion edge which is inserted into the first slit if the lock member is at the engaged position; and a restricting edge which is in contact with the first lock arm to restrict the rotation toward the disengaged position if the lock member is at the engaged position.

6. The reader according to claim 1, wherein:

the mirror unit includes a fixed surface extending along the slide surface; and the rotatable lock member is fixed to the fixed surface.

7. The reader according to claim 6, wherein:

the light source unit and the mirror unit are moved away from and toward the slide surface; and the lock member situated at the engaged position is engaged with the operation member and the light source unit through the first and second openings if the light source unit and the mirror unit are aligned along the slide surface.

8. The reader according to claim 7, further comprising a data generator configured to generate image data of the document in response to the reflected light, wherein:

the mirror unit moves in the housing so as to maintain a predetermined optical distance between the light source unit and the data generator.

9. An image forming apparatus, comprising:

the reader according to claim 8; and an image forming unit configured to form the image in response to the image data.

* * * * *